Oct. 9, 1934.    JEAN-JACQUES FRICK    1,976,551
ARC WELDING SYSTEM
Filed Aug. 14, 1933
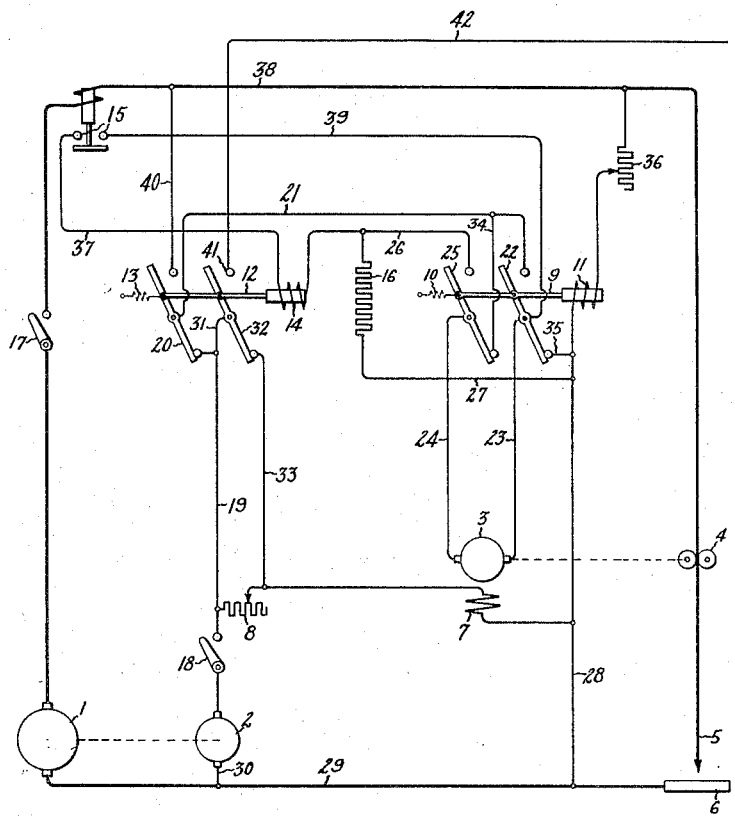
Inventor:
Jean-J. Frick,
by Harry E. Dunham
His Attorney.

Patented Oct. 9, 1934

1,976,551

UNITED STATES PATENT OFFICE 1,976,551

ARC WELDING SYSTEM

Jean-Jacques Frick, Belfort, France, assignor to General Electric Company, a corporation of New York Application August 14, 1933, Serial No. 685,129
In France August 22, 1932

6 Claims. (Cl. 219—8)

My invention relates to arc welding systems wherein the speed and direction of rotation of an electrode feed motor is controlled to feed an electrode toward and away from a cooperating electrode to strike and thereafter maintain a welding arc of predetermined length.

It is an object of my invention to provide an improved system of the type above described in which the feed motor is connected to a source of substantially constant voltage during operations involving reversals of the motor, and in which the connections of the motor are transferred from said source to the terminals of the welding arc after the arc has been struck and the electrode has attained a predetermined forward feeding speed by reason of which the arc has assumed its optimum working characteristics.

It is a further object of my invention to increase the excitation of the feed motor when it is connected to the constant voltage source of supply during operations involving reversals of the feed motor.

It is a further object of my invention to reduce the speed at which the electrode is fed toward its cooperating electrode relative to the speed at which said electrode is fed away from said cooperating electrode.

Further objects of my invention will become apparent from a consideration of one embodiment thereof diagrammatically illustrated in the accompanying drawing.

In this drawing the welding generator is indicated at 1 and an exciter therefor at 2. In order to simplify the diagram the field circuits of these two machines have not been illustrated. These machines may be driven by any suitable prime mover such as an electric motor, a gas engine or the like. The welding generator is adapted for supplying welding current to a welding arc and the exciter 2 not only supplies excitation for the welding generator but also acts as a source of substantially constant voltage for the electrode feed motor. The armature of the feed motor is illustrated at 3. It is mechanically connected to feed rolls 4 which engage the welding electrode 5 and feed it toward and away from a cooperating electrode which may be the work 6 illustrated in the drawing. The field for the feed motor 3 is illustrated at 7 and an adjusting resistance therefor at 8. The connection of the feed motor armature 3 to the exciter 2 is controlled by a reversing switch 9 normally biased to the position illustrated in the drawing by a spring 10 and controlled by an operating winding 11 connected across the electrodes 5 and 6. The connection of the feed motor 3 is transferred from the exciter 2 to the terminals of the welding arc through the agency of a transfer switch 12. This switch 12 is normally biased to the position illustrated in the drawing by a spring 13 and has an operating winding 14 whose circuit is completed through the contacts of the reversing switch 9 and contacts 15 of a relay connected to be responsive to the flow of welding current. A resistance 16 is provided for decreasing the operating speed of the feed motor when connected for feeding the electrode 5 toward its cooperating electrode 6. The connection of the feed motor and its control circuits to the exciter 2 is controlled by a manually operated switch 18.

The connections of the various parts above referred to and their cooperation with one another will best be understood from a consideration of the operation of the system which is as follows: After the set 1, 2 has been started and the switches 17 and 18 have been closed, the voltage of the welding generator 1 is applied to the operating coil 11 of the reversing switch 9. This closes the switch 9 against the action of its biasing spring 10 and completes an operating circuit for the feed motor 3 as follows: From one terminal of exciter 2 through switch 18, conductor 19, contact 20 of switch 12, conductor 21, contact 22 of switch 9, conductors 23 and 24, contact 25 of switch 9, conductor 26, resistance 16 and conductors 27, 28, 29 and 30 to the other terminal of the exciter 2. The field 7 of the feed motor is excited through the following circuit: From one terminal of the exciter 2 through switch 18, conductors 19 and 31, contact 32 of switch 12, and conductors 33, 28, 29, and 30 to the other terminal of the exciter 2. The feed motor thus connected operates with full excitation in a direction to feed the electrode 5 toward its cooperating electrode 6. As soon as the electrode 5 engages the electrode 6 the operating coil 11 of the reversing switch 9 is short-circuited and this switch moves under the influence of its biasing spring 10 to the position illustrated in the drawing thereby completing the following circuit for the feed motor: From one terminal of the exciter 2 through switch 18, conductor 19, contact 20 of switch 12, conductors 21 and 34, contact 25 of switch 9, conductors 24 and 23, contact 22 of switch 9, and conductors 35, 28, 29 and 30 to the other terminal of the exciter 2. This reverses the connections of the armature 3 of the feed motor with the source of supply of the exciter 2 and the feed motor operates in a reverse direction to withdraw the electrode 5 from its cooperating electrode 6 to strike the arc. As soon as the arc attains a predetermined length which may be determined by the adjustment of a resistance 36 connected in series with the operating coil 11 of the switch 9, this switch will again be moved against the action of the biasing spring 10 to complete the circuit initially traced for connecting the feed motor to the exciter 2 and thereby again reversing the motor to feed the electrode 5 toward its cooperating electrode 6. As soon as the speed and counter-electromotive force of the feed motor attains a predetermined value, the operating coil 14 of switch 12 will be sufficiently energized to operate this switch and transfer the connection of the feed motor from the exciter 2 to the terminals of the welding arc established between the electrodes 5 and 6. The operating voltage of switch 12 may be made adjustable by inserting an adjusting resistance in series with its operating coil 14. The circuit of the operating coil 14 of switch 12 is connected across the feed motor armature 3 through the following circuit: From one terminal of the armature of the feed motor through conductor 24, contact 25 of switch 9, conductors 26 and 37, contacts 15 of a relay whose operating coil is connected in the welding circuit 38, conductors 39 and 23 to the other terminal of the armature of the feed motor. The operation of switch 12 transfers the connection of the feed motor from the exciter 2 to the terminals of the arc by completing the following circuit: From one terminal of the arc through conductor 40, contact 20 of switch 12, conductor 21, contact 22 of switch 9, conductors 23 and 24, contact 25 of switch 9, conductor 26, resistance 16, and conductors 27 and 28 to the other terminal of the welding arc. The operation of switch 12 also inserts the resistance of rheostat 8 in series with the field 7 of the feed motor by interrupting the circuit in shunt to this resistance through conductors 19, 31 contact 32 of switch 12 and conductor 33. The feed motor when thus connected operates to feed the electrode 5 toward its cooperating electrode 6 in response to the voltage and length of the arc between these electrodes.

Inasmuch as the feed motor is connected to the arc terminals, the electrode feeding speed thereof is automatically regulated since an increase in the voltage of the arc brings about an acceleration of the motor and thereby a quicker feeding of the electrode whereas a decrease in the voltage of the arc brings about a deceleration of the motor and a slower feeding of the electrode. The feed motor will thus operate depending upon the adjustment of its field rheostat 8 to maintain an arc of predetermined length and voltage.

The system above described is applicable for automatic arc welding as well as semi-automatic arc welding. In automatic arc welding means are usually provided for traversing the welding arc and work relative to one another during the welding operation. In the system illustrated in the drawing the switch 12 has been provided with an additional contact 41 by means of which the control circuit 42 of a traversing motor may be controlled. With the arrangement illustrated the circuit of the traversing motor will be completed through contact 41 and conductor 42 upon the closure of switch 12 against the bias of its spring 13 which occurs after the welding arc has been struck and the feed motor has been connected across the terminals of the welding arc.

My invention is not limited to the particular embodiment thereof illustrated and described above, since various modifications may be made without departing from the teachings thereof, and I seek, therefore, in the appended claims to cover all modifications which fall within the true spirit and scope of my invention.

What I claim as new and desire to secure by Letters Patent of the United States is:

1. In a welding system wherein the speed and direction of rotation of a feed motor are controlled to feed an electrode toward and away from a cooperating electrode to strike and thereafter maintain a welding arc of predetermined length, a source of substantially constant voltage, means for connecting said feed motor to said source during operations involving reversals of said motor, and means for connecting said motor across the terminals of said arc when said motor has acquired a predetermined forward electrode feeding speed after said welding arc has been struck.

2. In a welding system wherein the speed and direction of rotation of a feed motor are controlled to feed an electrode toward and away from a cooperating electrode to strike and thereafter maintain a welding arc of predetermined length, a source of substantially constant voltage, means for connecting said feed motor to said source during operations involving reversals of said motor, means for connecting said motor across the terminals of said arc when said motor has acquired a predetermined forward electrode feeding speed after said welding arc has been struck, and means for increasing the excitation of said motor when connected to said source of substantially constant voltage.

3. In a welding system wherein the speed and direction of rotation of a feed motor are controlled to feed an electrode toward and away from a cooperating electrode to strike and thereafter maintain a welding arc of predetermined length, a source of substantially constant voltage, means for connecting said feed motor to said source during operations involving reversals of said motor, means for connecting said motor across the terminals of said arc when said motor has acquired a predetermined forward electrode feeding speed after said welding arc has been struck, means for increasing the excitation of said motor when connected to said source of substantially constant voltage, and means for reducing the speed at which said motor feeds its electrode toward a cooperating electrode relatively to the speed at which it feeds said electrode away from said cooperating electrode.

4. In a welding system wherein the speed and direction of rotation of a feeding motor are controlled to feed an electrode toward and away from a cooperating electrode to strike and thereafter maintain a welding arc of predetermined length, a source of substantially constant voltage, means for reversing the connection of said motor with said source, means responsive to the voltage across said electrodes for operating said reversing means, and means responsive to the flow of welding current and a predetermined voltage of said motor during its rotation in a direction to feed an electrode toward its cooperating electrode for transferring the connection of said motor from said source to the terminals of the welding arc established between said electrodes.

5. Welding apparatus comprising means for feeding an electrode toward and away from a cooperating electrode, a motor, means for mechanically connecting said motor to said feeding means, a source of substantially constant voltage, means for reversing the connections of said motor with said source during operations involving reversals of said motor and said feeding means, and means responsive to the flow of welding current and a predetermined forward electrode feeding speed of said motor for transferring the connection of said motor from said source to the terminals of the welding arc established between said electrodes.

6. Welding apparatus comprising means for feeding an electrode toward and away from a cooperating electrode, a motor, means for connecting said motor to said feeding means, a source of substantially constant voltage, means for reversing the connection of said motor with said source, means responsive to the voltage across said electrodes for operating said reversing means, and means responsive to a predetermined counter-electromotive force of said motor when connected to said source for feeding an electrode toward its cooperating electrode after a welding arc has been struck between said electrodes for transferring the connection of said motor from said source to the terminals of said welding arc.

J. J. FRICK.